H. S. BERGEN.
AUTOMATIC WEIGHING SCALE.
APPLICATION FILED MAY 17, 1915.

1,294,382.

Patented Feb. 18, 1919.
4 SHEETS—SHEET 1.

WITNESSES:
D. C. Watter
Carl Jinke

INVENTOR.
Harry S. Bergen
BY George R. Frye.
ATTORNEY

UNITED STATES PATENT OFFICE.

HARRY S. BERGEN, OF TOLEDO, OHIO, ASSIGNOR TO TOLEDO SCALE COMPANY, OF TOLEDO, OHIO, A CORPORATION OF NEW JERSEY.

AUTOMATIC WEIGHING-SCALE.

1,294,382.   Specification of Letters Patent.   Patented Feb. 18, 1919.

Application filed May 17, 1915. Serial No. 28,511.

*To all whom it may concern:*

Be it known that I, HARRY S. BERGEN, residing at Toledo, in the county of Lucas and State of Ohio, have invented certain new and useful Improvements in Automatic Weighing-Scales, of which the following is a specification.

The present invention relates to pendulum weighing scales and although not necessarily confined in all of its uses to computing scales, nevertheless it is particularly adapted for utilization in this latter type of apparatus, wherein it is customary to employ an auxiliary weight which, when placed upon the pendulum, increases the weighing and computing capacity of the scales.

In the particular type of pendulum scales, to which the invention is especially adapted, it is customary to employ a chart or table of computations and weights, together with an index hand carried by the pendulum and arranged to sweep over such chart or table, said hand having inscribed upon it one or more rows of price numerals. The pendulum is appropriately connected with a scale beam carrying a platter, on which the commodity to be weighed is placed. The weight of such commodity causes the index hand to move over the chart and properly indicate the weight of the commodity by pointing to one of the weight numerals on the chart or a graduation mark associated therewith. The particular numerals on the index hand denoting the price per pound or other unit of measure locates the proper computation, the index hand being usually formed along one edge in such manner as to assist in locating the computation, as for instance, being formed with series of fingers spaced apart to correspond with the price numerals. To provide for an increased weighing capacity such as effected through the medium of the auxiliary weight on the pendulum, it is customary to inscribe two rows of weight numerals on the chart, one representing double the weighing range of the other and to inscribe upon the index hand two parallel rows of price numerals, each numeral of one row being double the companion numeral of the other row. Contrasting colors are ordinarily employed, so that the user of the scale, as well as the customer, may readily perceive whether the scales are being used under one weighing capacity or the other and there will be no mistake in the use of the price numerals for determining the proper computations.

The principal object of the present invention is to provide improved means for placing the auxiliary weight upon the pendulum and removing it therefrom and insuring its being held in proper position when either on or off the pendulum, which means render it entirely unnecessary for the user of the scales to handle the auxiliary weight, the latter remaining at all times within the casing of the machine. Thus, the invention provides for the removal of the auxiliary weight from the pendulum by simply turning a knob which protrudes from the casing of the scale, the carrier for the auxiliary weight being then automatically lifted, caught, and held beyond the range of the pendulum's swing. The replacing of the auxiliary weight upon the pendulum involves merely the turning of the knob in the opposite direction, said carrier and the auxiliary weight being thus caused to fall by gravity and also being urged by mechanical means to travel its full predetermined distance, the said weight being automatically deposited upon the pendulum while the carrier takes up a position out of the range of the pendulum's swing. To state more specifically the object of the invention in this connection, it may be said that the same is to effectually guard against any possible escape of the auxiliary weight in the process of its removal from, or replacement upon, the pendulum, and insure its being held in proper position when either on or off the pendulum, even though the manipulation of parts provided for the proper handling of the auxiliary weight be done carelessly, or with intentional violence, or in attempt to defraud.

With this and incidental objects in view, the invention consists in certain novel features of construction and combinations of parts, the essential elements whereof are recited in the appended claims and a preferred form of embodiment of which is illustrated in the acompanying drawings and described in detail hereinafter.

It will not be necessary to give a detail description of the particular type of computing scales here chosen for the purposes of illustrating the preferred embodiment of the invention, because that type of scale is well known through extensive commercial use and a considerable number of prior patents, (for example, the DeVilbiss reissued Patent, No. 12,029, dated Sept. 9, 1902).

Figures 1, 2:
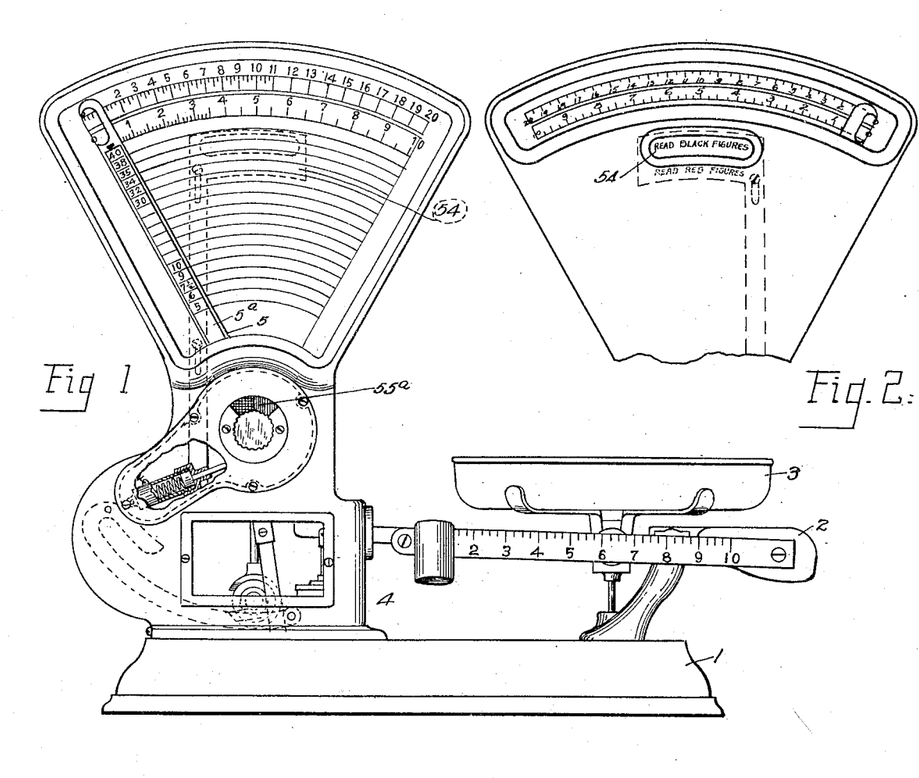
Figure 1 is a front elevation, with portions broken away, of a pendulum weighing scale with the present improvements embodied thereon.
Fig. 2 is a rear elevation of the upper portion of the chart housing.
Figure 4:
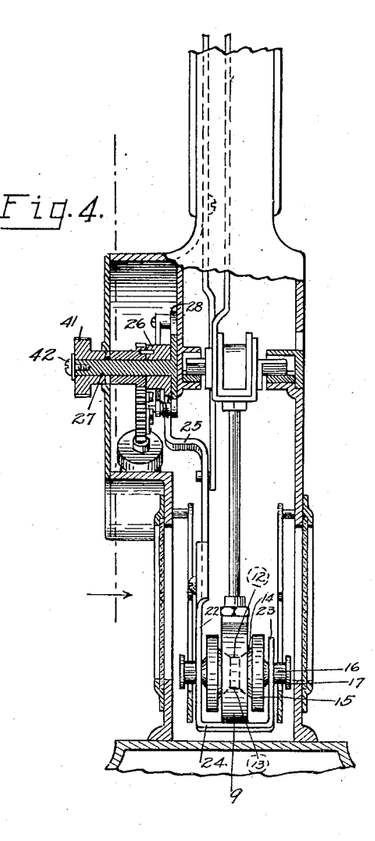
Fig. 4 is a vertical transverse section taken substantially on the line 4—4 of Fig. 3.

The reference numeral 1 designates a suitable base, above which is fulcrumed a scale beam 2, supporting a scale pan 3 and connected within a housing 4 with an index arm 5 which works over a computing chart 6 and has a rear portion 7 working over two rows of weight numerals on the rear side of the chart plate. Corresponding rows of weight numerals appear on the front side of said plate just above the chart or table of computations and it is customary to inscribe them in contrasting colors. The upper row provides for double the weight capacity of the lower row and the index arm 5 ordinarily bears two vertical rows of numerals correspondingly contrasted in color and denoting prices per unit of weight, one row for use when the scales are working in one weight capacity and the other row being used when the scales are working in the other weight capacity. Preferably the two vertical rows on the index-arm are inscribed on opposite sides of a rotatable strip or bar 5ª suitably journaled in bearings carried by the index-arm, this strip or bar being so located upon the index-arm that when turned with either side facing outwardly the numerals thus presented to view will register with the various rows of numerals upon the computing chart to coact therewith in locating the proper computation on the chart. The vertical rows on the strip or bar 5ª are preferably formed of contrasting colors, as, for example, one of red and one of black. The index-arm 5 is compounded with a pendulum 8 arranged to swing within the housing 4 and it will be understood that the different sets of weight and price numerals are to be read according to the weighing of the pendulum. The latter carries at its lower end a permanent weight 9 of disk-like form made with a radial and slightly flaring opening 11 entering one side and extending around the center of the disk concentrically therewith. The concentric portion of the side of this opening extends through more than a half circle and the lower edge of the opening beyond the concentric portion diverges from the upper edge. Thus a slight depression 10 is formed in the lower side of the radial opening at the inner end thereof, as clearly shown in Fig. 5. The portion of the weight disk 9 immediately surrounding the said radial opening is substantially V-shaped in cross-section or edge view, as illustrated in Fig. 4, although this formation is not continued to a sharp edge but terminates in a narrow flat surface 12. The auxiliary weight takes something the shape of a dumbbell, comprising a reduced central portion 13 of the same lateral extent as the said flat surface 12 of the permanent weight and the two side portions 14 in the form of truncated cones, whose angles correspond with those of the V-shaped portions of the permanent weight as clearly shown in Fig. 4. Beyond these side portions 14 the auxiliary weight is formed with flanges 15 designed to take over the sides of the permanent weight beyond the V-shaped portions thereof, and from the centers of the flanged heads of the auxiliary weight project trunnions 16 with flanged ends 17 for a purpose hereinafter described.

Without proceeding further, it will be seen that the above-described formation of the permanent and auxiliary weights is calculated to insure a perfectly accurate and correct engagement between them and one which can not readily be disturbed when once established. The reduced central portion 13 of the auxiliary weight resting in the depression 10 of the permanent weight insures against accidental removal of the auxiliary weight in a radial direction and the engagement of the conical portions 14 of the auxiliary weight with the V-shaped portions of the permanent weight serves to insure the auxiliary weights properly entering the opening in the permanent weight and taking up the proper position therein. The flanges 15 also serve to prevent any possible axial displacement of the auxiliary weight. As will hereinafter appear this particular construction or formation of the weights is of peculiar advantage in connection with the means hereinafter described for removing and replacing the weight at will.

Proceeding now to a description of the means employed for controlling the auxiliary weight, the numeral 18 designates a pair of rails mounted within the housing 4 and constituting a track upon which the auxiliary weight may travel. These rails are secured at one end in the base of the housing, as indicated at 19, on opposite sides of the pendulum somewhat beyond the limit of the latter's downward swing and they pass the permanent pendulum weight 9 on opposite sides thereof at a level slightly below the depressed portion 10 of the opening in said weight. These rails thence curve upwardly and extend to a point beyond the limits of the upward swing of the pendulum, then curving back over themselves as at 20 to form guide-ways or runways 21. The trunnions 16 of the auxiliary weight extend over these rails respectively and the flanges 17 take over the outer sides of the rail. It will be seen, therefore, that this auxiliary weight may roll up and down the track formed by said rails without danger of leaving the same and always preserved in proper position to enter and leave the opening in the permanent pendulum weight. The runways 21 provide for the auxiliary weights being maintained in proper position at an elevated part of the track when not engaged with the permanent weight and when the scales are in use at the lower weight capacity this auxiliary weight is retained at the upper ends of the runways 21, the permanent weight 9 being then free to swing through its arc without being at all influenced by the additional devices employed to change the capacity of the scales.

Figure 3:
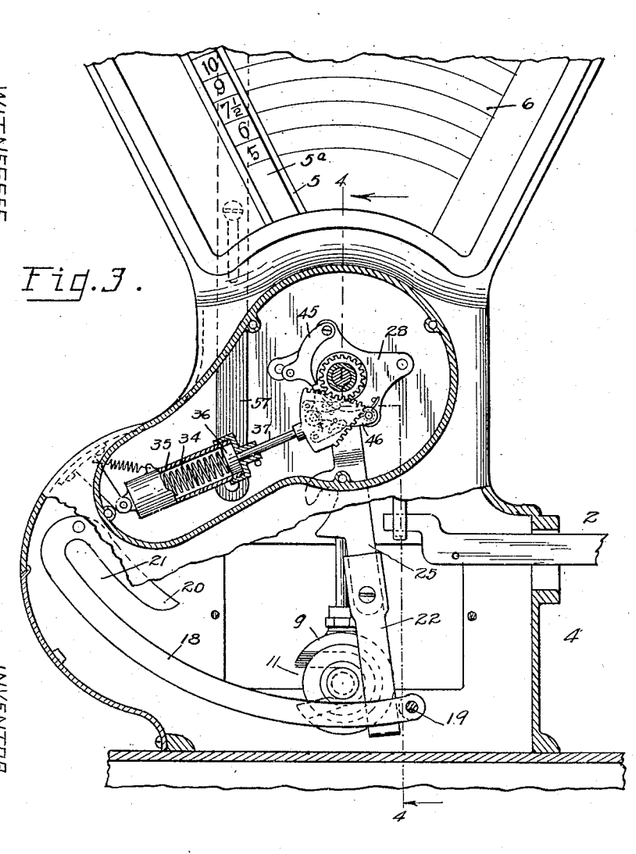
Fig. 3 is an enlarged detail view of portions of the scale, partly in front elevation, and partly in longitudinal section, the auxiliary weight being shown in position upon the pendulum.

The auxiliary weight is moved upwardly on its track and held in its inoperative position by means of a hanger arranged to travel between the rails 18 and comprising arms 22—23 acting against the trunnions 16 and a connecting bar 24, the latter sufficiently lowered to pass underneath the permanent pendulum weight 9. The arm 22 of this bracket or hanger is secured to a pendant arm 25 which has a hub 26 journaled upon a shaft 27 carried by a bracket plate 28 fastened to the front of the housing 4 concentrically with the fulcrum of the pendulum, as shown in Fig. 4. Said arm 25 and the hanger form a unitary structure arranged to swing upon a center coincident with that of the pendulum and through a range of movement sufficiently to carry the auxiliary weight entirely beyond the upward swing of the pendulum weight 9, as shown in Fig. 5, and also to leave the pendulum free as to the extent of its downward swing when carrying the auxiliary weight, as shown in Figs. 1 and 3.

Figures 8, 11, 13:
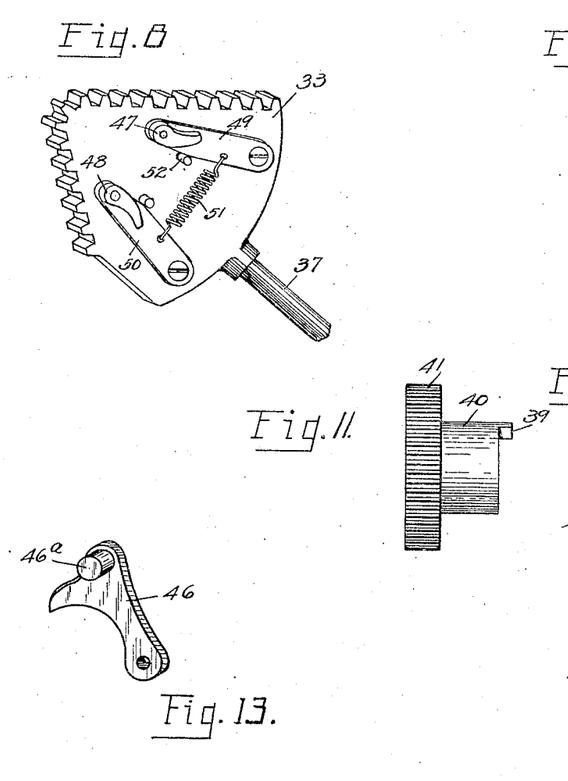
Figs. 8–13 are detail views of parts of the operating mechanism to be hereinafter described.

The means for operating the auxiliary weight carrier composed of the arm 25 and the hanger as above mentioned will now be described. The upper part of the arm 25 forming the hub 26 is provided with a curved slot 29, (see Figs. 10 and 12) in which slot a pin 30 projecting from the elongated sleeve 31 extends, the pin 30 being positioned and arranged to be freely moved from one end wall of the slot to the opposite end wall thereof and then to engage said end wall to force the hub 26 and the arm 25 to rotate in conjunction with the pin 30 during further rotative movements. The elongated sleeve 31 is journaled upon the shaft 27 and carries a pinion 32 arranged to mesh with a wedge-shaped rack member 33 yieldingly pressed into engagement with said pinion by means of the spring 34 inclosed within the cylindrical casing 35 and bearing against the plunger 36, the stem 37 of which is suitably secured to or formed integrally with the wedge-shaped rack (see Figs. 6, 7 and 8). The spring 34 is designed to be of sufficient strength to not only at all times hold the wedge-shaped rack in engagement with the pinion 32 but also when it is desired to swing the hanger or bracket to remove or replace the auxiliary weight to exert sufficient force to rotate the pinion 32 through the medium of the wedge-shaped rack 33, the pin 30 transmitting the rotative movement of the pinion 32 to the arm 25 of the bracket or hanger, substantially as hereinafter more fully described. At its forward end, the sleeve 31 is formed with a longitudinally projecting lug 38 adapted to be engaged by the rearwardly projecting lug 39 extending from the hub 40 of the operating knob 41, which knob is journaled upon the shaft 27 adjacent its forward end and is held against longitudinal movement thereon by means of the set screw 42 (see Fig. 4).

Figures 5, 6, 7:
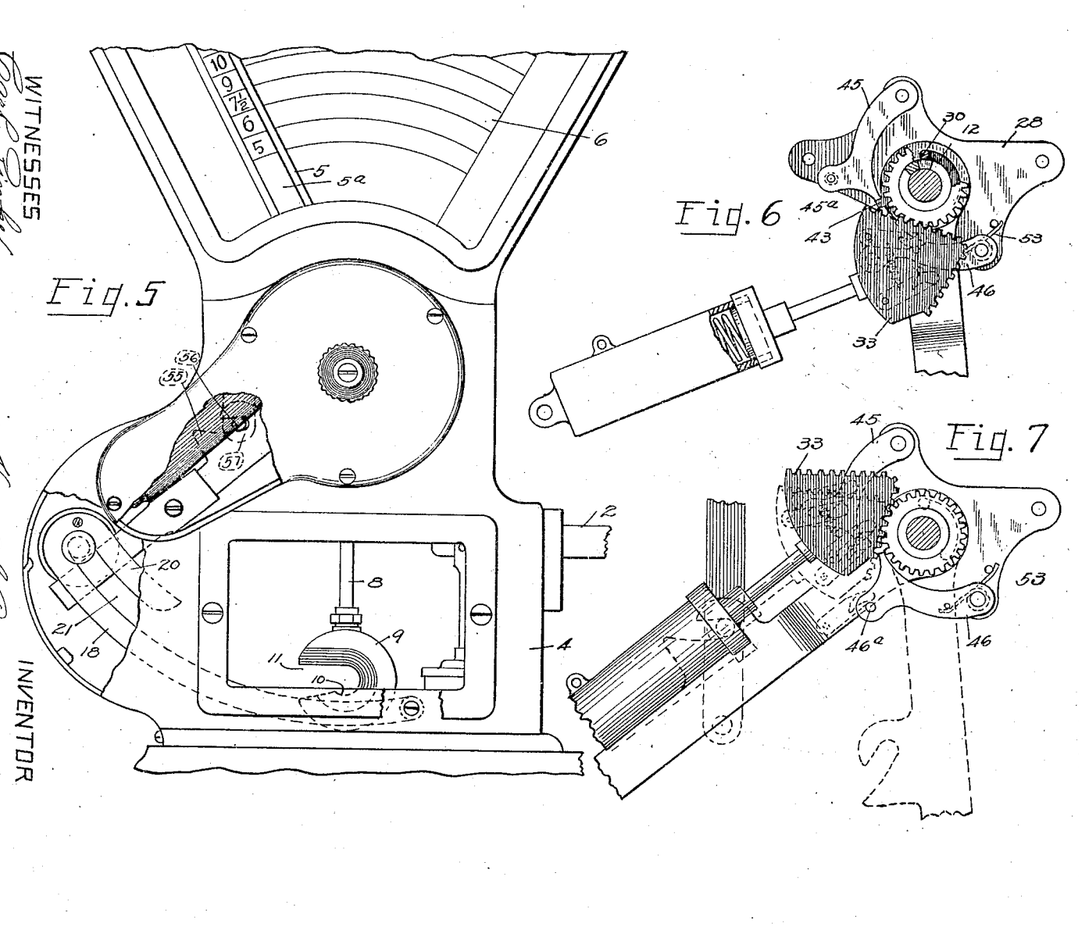
Fig. 5 is a view in front elevation, with portions broken away, of a portion of the scale, the parts being shown in the position assumed when the auxiliary weight is removed from the pendulum.
Figs. 6 and 7 are enlarged detail views showing portions of the operating mechanism for removing and replacing the auxiliary weight upon the pendulum.
Figures 9, 10, 12:
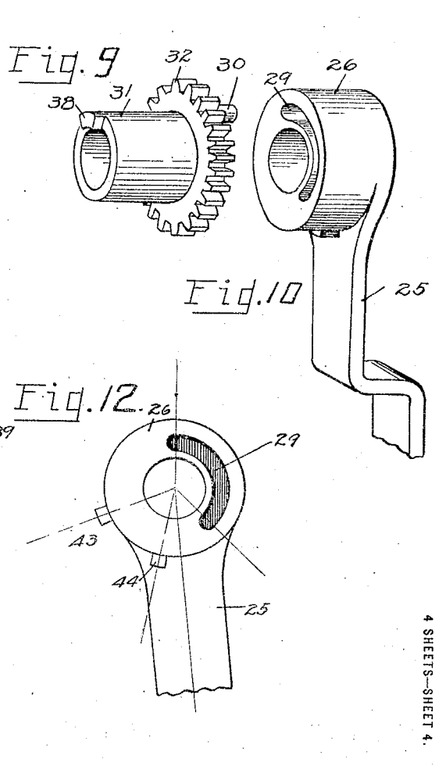

As clearly shown in Fig. 12, the hub 26 of the arm 25 is formed with a pair of ratchet teeth 43 and 44 arranged to coact with the pawls 45 and 46, which pawls are pivotally mounted substantially as shown in Fig. 6 upon the bracket plate 28 to normally swing within the path of travel of the ratchet teeth 43 and 44, normally contacting with opposite sides of the ratchet 44 when the auxiliary weight is off the pendulum and with the ratchet 43 when the auxiliary weight is in position upon the pendulum. Projections 45ᵃ and 46ᵃ are formed upon the pawls 45 and 46 respectively (see Fig. 13) and extend laterally therefrom into the path of movement of the cam-shaped lugs 47 and 48 respectively carried by the pivoted arms 49 and 50, which arms are suitably pivoted upon one face of the wedge-shaped rack 33 (see Fig. 8) in position to bring the proper surfaces of the cam-shaped lugs 47 and 48 into contact with the projections 45ᵃ and 46ᵃ when the rack is moved to swing the hanger and the auxiliary weight. The pivoted arms 49 and 50 are normally held in this desired position by means of a tension spring 51 yieldingly holding the arms in contact with suitable lugs 52 projecting from the rack 33, as clearly shown in Fig. 8. A spring 53 is preferably provided to maintain the pawl 46 in an elevated position in contact with one of the ratchet teeth 43 or 44.

Operation: With the scale operating at the higher weight capacity the parts will be relatively positioned as shown in Figs. 1 and 3, the auxiliary weights being, of course, upon the pendulum to augment its counterbalancing effect in the weighing of goods. The bracket or hanger has left contact with the auxiliary weight and maintains a position beyond the same so as to leave the pendulum entirely free from any counter-acting influence. At this time the indicator plate 54 (see Fig. 2) displays the inscription "Read Red Figures" through an opening in the rear of the housing 4 and the side of the rotatable strip or bar 5ª exhibiting red figures is displayed while the red portion of the bi-colored rotatable placard 55ª (see Fig. 1) may be shown through an opening in the front of the housing. To adjust the scales for the lower weight capacity it is only necessary to turn the knob 41 to the right. The first effect will be to move the lug 39 into contact with the lug 38 upon the sleeve 31, and then further rotation will rotate the pinion 32 to advance the wedge-shaped rack from the position shown in Figs. 1 and 3 to an intermediate position wherein its apex is in alinement with the center of the pinion 32, the pin 30 being at the same time moved from its position adjacent one end of the curved slot 29 toward the opposite end of said slot. In the movement of the rack toward the intermediate position, the cam-shaped lug 48 upon the pivoted arm 50 is brought into contact with the projection 46ª upon the pivoted pawl 46, the pawls 45 and 46 being at this time in contact with the opposite sides of the ratchet 43, as shown in Fig. 6. The contact of the cam-shaped lug 48 with the projection 46ª will continue until the further movement of the rack causes the pivoted arm 50 to swing outwardly against the tension of the spring 51 to a position where the cam-shaped lug 48 will slide off from the projection 46ª, the spring then returning the pivoted arm 50 to its former position. After the rotation of the pinion 32 to a point where the rack 33 has been advanced a very slight distance beyond the intermediate position above mentioned, the pressure of the spring 34 will immediately force the rack 33 to rotate the pinion 32 and the pin 30 secured thereto until the position shown in Fig. 5 is reached, the arm 25 and hanger being swung to the extreme position and the auxiliary weight thereby carried out of the radial opening in the permanent pendulum weight and rolled up the inclined track provided by the rails 18 until the auxiliary weight passes beyond the limits of the pendulum swing, the hanger being suitably held in this upper position and the auxiliary weight thus maintained at the upper ends of the track or runway 21, all as clearly shown in Fig. 5. During the driving movement of the rack 33 under pressure of the spring 34 the upper face of the cam-shaped lug 47 contacts with the projection 45ª upon the pivoted pawl 45 and lifts the pawl 45 out of the path of travel of the ratchet 43, allowing the pinion 32 and hub 26 of the arm 25 to rotate together, the curved slot 29 being positioned and arranged in the hub 26 so that the end wall thereof will be contacted by the pin 30 just after the pawl 45 has been lifted from its normal position obstructing the movement of the ratchet 43. The upward swinging movement of the hub 26 brings the ratchet 44 thereon into position to be contacted by the pawls 45 and 46 after the auxiliary weight has been moved to its extreme upward position, the pawl 45 falling into engagement with the upper side of the ratchet 44 after the cam-shaped lug 47 has been carried out of engagement with the projection 45ª during the travel of the rack. As the arm 25 moves upwardly in this operation the projection 55 (see Fig. 5) engages the pin 56 carried adjacent the lower end of the indicator staff 57 and raises the indicator staff and the indicator plate 54 carried thereby so as to change the indication showing through the opening in the rear of the housing (see Fig. 2), this new inscription preferably being "Read Black Figures". Also suitable mechanism is set into operation to turn the rotatable strip or bar 5ª upon the index-arm 5 so that the row of numerals inscribed in black will be displayed.

To replace the auxiliary weight on the pendulum it is simply necessary to turn the knob 41 to the left until the lug 39 thereon contacts with the opposite side of the lug 38, further rotation of the knob then moving the sleeve 31 and the pinion 32 carried thereby to return the rack 33 from the position shown in full lines in Fig. 7 to an intermediate position wherein its apex is in alinement with the center of the pinion 31. In this movement of the rack toward the intermediate position the cam-shaped lug 47 upon the pivoted arm 49 contacts with the projection 45ª upon the pawl 45 and swings the pivoted arm 49 outwardly against the tension of the spring 51 until the cam-shaped lug slides off from the projection 45ª, the spring then returning the pivoted arm 49 to its normal position. After the rotation of the pinion 32 to a point where the rack has been returned a very slight distance beyond the intermediate position above mentioned, the pressure of the spring 34 will be exerted to rotate the pinion 32 and hub 26 of the arm 25 as a unitary structure, the hanger arm and the auxiliary weight being forced downwardly from the raised positions shown in Fig. 5 to the position shown in Figs. 1 and 3, the auxiliary weight rolling into the radial opening in the permanent pendulum weight in which it lodges in proper position to form part of the counterpoise of the scale, and the hanger moving to a position beyond the pendulum so as to leave the pendulum entirely free to swing in its load counter-balancing movements. During the falling movement of the hanger and auxiliary weight, the rack 33 is moved so as to bring the cam-shaped lug 48 into engagement with the projection 46ª upon the pawl 46 and carries the pawl 46 out of the path of travel of the ratchet 44 so that the rotative movement of the pinion 32 and the descending swinging movement of the arm 25 can be effected as above described, the pin 30 engaging the end wall of the slot 29 just after the pawl 46 has been lifted from its position obstructing the movement of the ratchet 44. As the arm 25 descends in this operation it draws down the indicator plate 54 so as to change the indication at the back of the scale, suitable means being also set into operation to turn the rotatable strip or bar 5ª upon the index-arm 5.

It will be seen that the means above described for controlling the auxiliary weight does not depend at all upon any particular position which the pendulum may occupy and hence it is not necessary to provide any means for positioning the pendulum in removing the auxiliary weight therefrom or in replacing said weight thereon.

Also the spring 34 is so arranged relatively to the rack 33 and pinion 32 that whenever attempt is made to move the hanger arm and the auxiliary weight the movement must be completed, i. e., the spring 34 through the intermediate mechanism will force the hanger arm and auxiliary weight to at all times remain at one or the other extreme of its path of movement.

While it will be apparent that the illustrated embodiment of my invention herein shown is well calculated to adequately fulfil the several objects of the invention, it will be understood that the construction is susceptible to modification, variation and changes without departing from the spirit and scope of the invention as set forth in the subjoined claims.

Having described my invention, I claim:

1. The combination with pendulum scales, of an auxiliary weight for the pendulum, mechanical operating means for displacing and replacing the weight, and means coöperating with said operating means for forcing said weight to travel the full extent of its path of movement when moved from or toward the pendulum.

2. The combination with pendulum scales, of an auxiliary weight for the pendulum, mechanical operating means for displacing and replacing the weight, and spring-pressed means coöperating with said operating means for forcing said weight to travel the full extent of its path of movement when moved from or toward the pendulum.

3. The combination with pendulum scales, of an auxiliary weight for the pendulum, mechanical means for displacing and replacing the said weight, said means comprising a hanger arm arranged to be swung to engage the weight to remove it from the pendulum and to allow the return of the weight to the pendulum, and means for forcing the hanger arm to travel the full extent of its movement when swung in either direction.

4. The combination with pendulum scales, of an auxiliary weight for the pendulum, mechanical means for displacing and replacing the said weight, said means comprising a hanger arm arranged to be swung to engage the weight to remove it from the pendulum and to allow the return of the weight to the pendulum, and spring-pressed means for forcing the hanger arm to travel the full extent of its movement when swung in either direction.

5. The combination with pendulum scales, of an auxiliary weight for the pendulum, a track upon which said weight may travel into and out of engagement with the pendulum, a swinging arm for propelling the weight along said track and supporting it when out of engagement with the pendulum, and means for forcing said arm to swing the full extent of its travel when swung in either direction.

6. The combination with pendulum scales, of an auxiliary weight for the pendulum, a track upon which said weight may travel into and out of engagement with the pendulum, a swinging arm for propelling the weight along said track and supporting it when out of engagement with the pendulum, and spring-pressed means for forcing said arm to swing the full extent of its travel when swung in either direction.

7. The combination with pendulum scales, of an auxiliary weight for the pendulum, a track upon which said weight may travel into and out of engagement with the pendulum, a swinging arm for propelling the weight along said track and supporting it when out of engagement with the pendulum, a shaft upon which the swinging arm is mounted, a pinion mounted upon said shaft, and means for rotating the pinion to swing the arm in opposite directions.

8. The combination with pendulum scales, of an auxiliary weight for the pendulum, a track upon which said weight may travel into and out of engagement with the pendulum, a swinging arm for propelling the weight along said track and supporting it when out of engagement with the pendulum, a shaft upon which the swinging arm is mounted, a pinion loosely mounted upon said shaft, a spring-pressed rack meshing with said pinion, and means for rotating the pinion to swing the arm in opposite directions, the pressure exerted upon said rack serving to augment the rotative force upon said pinion during a portion of its movement.

9. The combination with pendulum scales, of an auxiliary weight for the pendulum, a track upon which said weight may travel into and out of engagement with the pendulum, a swinging arm for propelling the weight along said track and supporting it when out of engagement with the pendulum, a shaft upon which the swinging arm is mounted, a pinion loosely mounted upon said shaft, a spring-pressed wedge-shaped rack meshing with said pinion, and means for rotating the pinion to swing the arm in opposite directions, said rack being arranged so that the spring pressure upon said rack first resists and then augments the rotative force exerted upon said pinion.

10. The combination with pendulum scales, of an auxiliary weight for the pendulum, a track upon which said weight may travel into and out of engagement with the pendulum, a swinging arm for propelling the weight along said track and supporting it when out of engagement with the pendulum, means for swinging said arm in opposite directions, and means for holding the arm at the limits of its path of travel, including a pair of ratchets upon the hub of said arm and pawls arranged to engage said ratchets.

11. The combination with pendulum scales, of an auxiliary weight for the pendulum, a track upon which said weight may travel into and out of engagement with the pendulum, a swinging arm for propelling the weight along said track and supporting it when out of engagement with the pendulum, means for holding the arm at the limits of its path of movement comprising a pair of ratchets upon the hub of said arm and pawls arranged to engage either of said ratchets, means for removing said pawls from the path of the ratchets, and means for swinging the arm when the pawls are so removed.

12. The combination with pendulum scales, of an auxiliary weight for the pendulum, a track upon which said weight may travel into and out of engagement with the pendulum, a swinging arm for propelling the weight along said track and supporting it when out of engagement with the pendulum, means for holding the arm at the limits of its path of movement comprising a pair of ratchets upon the hub of said arm and pawls arranged to engage either of said ratchets, a pinion mounted to rotate adjacent the hub of the swinging arm, a rack meshing with the pinion, means carried by the rack for removing the pawls from the path of movement of the ratchets, and means for rotating the pinion to swing the arm when the pawls are so removed.

13. The combination with pendulum scales, of an auxiliary weight for the pendulum, a track upon which said weight may travel into and out of engagement with the pendulum, a swinging arm for propelling the weight along said track and supporting it when out of engagement with the pendulum, means for holding the arm at the limits of its path of movement comprising a pair of ratchets upon the hub of said arm and pawls arranged to engage either of said ratchets, a pinion mounted to rotate adjacent the hub of the swinging arm, a projection carried by the pinion and engaging said hub, a wedge-shaped rack meshing with the pinion, means carried by the rack for removing the pawls from the path of movement of the ratchets, and means for rotating the pinion to swing the arm when the pawls are so removed.

14. In weighing scales, the combination of a pendulum and its removable weight, of a carrier swinging on the same center as the pendulum and arranged to contact the weight to remove it from the pendulum, and means for swinging the carrier in opposite directions comprising a pinion mounted on the same axis as the carrier, a knob arranged to rotate the pinion in opposite directions, means coöperating with the pinion to insure its full predetermined movement in each direction, and connections between the pinion and carrier.

15. In weighing scales, the combination of a pendulum and its removable weight, of a carrier swinging on the same center as the pendulum and arranged to contact the weight to remove it from the pendulum, and means for swinging the carrier in opposite directions comprising a pinion mounted on the same axis as the carrier, a knob arranged to rotate the pinion in opposite directions, means coöperating with the pinion to insure its full predetermined movement in each direction, and a pin-and-slot connection between the pinion and carrier.

16. In weighing scales, the combination of a pendulum and its removable weight, of a carrier swinging on the same center as the pendulum and arranged to contact the weight to remove it from the pendulum, and means for swinging the carrier in opposite directions comprising a pinion mounted on the same axis as the carrier, a knob arranged to rotate the pinion in opposite directions, and a pin and slot connection between the pinion and carrier, and means for forcing the carrier to be swung to the full extent of its movement in either direction comprising a spring-pressed rack in engagement with the pinion.

17. In weighing scales, the combination of a pendulum and its removable weight, of a carrier swinging on the same center as the pendulum and arranged to contact the weight to remove it from the pendulum, means for swinging the carrier in opposite directions comprising a pinion mounted on the same axis as the carrier, a knob arranged to rotate the pinion in opposite directions, and a pin and slot connection between the pinion and carrier, latching means for holding the carrier at the limits of its path of travel, means for forcing the carrier to be swung to the full extent of its path of travel when moved in either direction comprising a spring-pressed rack in engagement with the pinion, and means carried by the rack for lifting the latching means to allow the swinging of the carrier.

18. In weighing scales, the combination of a pendulum and its removable weight, of a carrier swinging on the same center as the pendulum and arranged to contact the weight to remove it from the pendulum, means for swinging the carrier in opposite directions comprising a pinion mounted on the same axis as the carrier, a knob arranged to rotate the pinion in opposite directions, and a pin and slot connection between the pinion and carrier, latching means for holding the carrier at the limits of its path of travel comprising a pair of ratchets and pawls arranged to engage either of said ratchets, means for forcing the carrier to be swung to the full extend of its path of travel when moved in either direction comprising a spring-pressed rack meshing with said pinion, and means carried by the rack for lifting the ratchets to allow the swinging of the carrier.

HARRY S. BERGEN.

Witnesses:
 FRANCES C. DOYLE,
 GEORGE R. FRYE.

Copies of this patent may be obtained for five cents each, by addressing the "Commissioner of Patents, Washington, D. C."